June 8, 1965  C. H. PETERSON  3,188,120
ADJUSTABLE PIPE NIPPLE
Filed Oct. 21, 1964
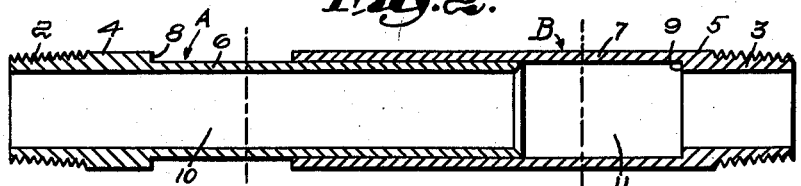
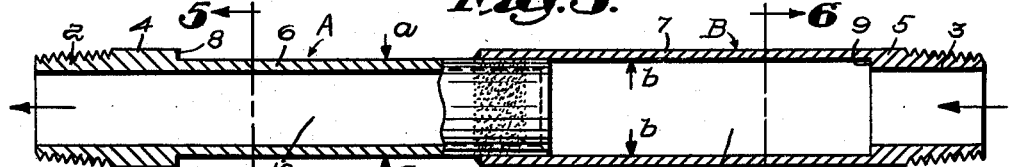
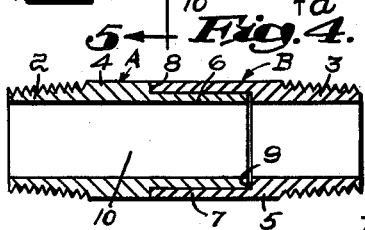 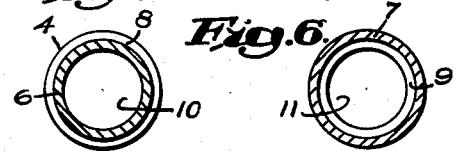
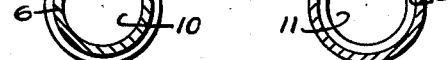
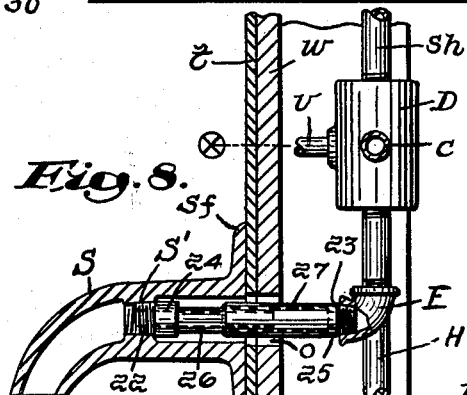
Inventor:
Chester H. Peterson,
by Blair and Buckler
Attorneys

United States Patent Office 3,188,120
Patented June 8, 1965

3,188,120
ADJUSTABLE PIPE NIPPLE
Chester H. Peterson, 20 Highland Ave., Braintree, Mass.
Filed Oct. 21, 1964, Ser. No. 405,891
3 Claims. (Cl. 285—175)

This is a continuation in part of my application for patent Serial No. 282,714, for Adjustable Pipe Nipple, filed May 23, 1963, and now abandoned.

This invention relates to a plumbing fitting and particularly to an adjustable pipe nipple which is a unitary construction made as an article of manufacture for a plumber, and adapted to be used on the job for connecting two open ends of pipe that are separated by a small distance within the limits of the contracted and expanded lengths of any one unitary size of the said adjustable pipe nipple.

Present adjustable pipe nipples leave much to be desired. Thus, most said nipples rely upon threads and a deformable gasket. Present such adjustable nipples using solder for the unifying means also leave much to be desired.

My invention is drawn to a new finesse in critical measurement and construction not previously known in an adjustable pipe nipple in order to gain the advantages of a smooth wall nipple over a threaded wall nipple which is expensive to make and which weakens the nipple by the amount of the depth of the cut threads.

My invention is further drawn to such a described adjustable pipe nipple as may now employ solder as the unifying means with a degree of surety never before attained.

My invention therefore, is drawn to a new critical relationship of the interspace between the walls of the pipe elements, the relative thickness of the walls of the pipe elements, the hardness of the walls of the pipe elements and all adapted to the application of solder to the end that an adjustable pipe nipple is constructed that will not fail and, wherein the length of the sweatjoint is at least twice the outside diameter of the inside pipe element.

Now the advent of small bore flexible copper pipe has been like a windfall to plumbers in that a fitting for example an elbow may be joined properly to a straight pipe without the use of threads, plumber's dope or a wrench to "make-up" the joint and employing solder only. But here with respect to an adjustable pipe nipple, the advantage has abruptly ended.

Now therefore in the accompanying drawing and in accordance with my invention:

FIG. 1 is a partial sectional view of my adjustable pipe nipple.

FIG. 2 is a sectional view of the said nipple in partial extended position.

FIG. 3 is a view like FIG. 2 showing fuller extension of the nipple.

FIG. 4 is a sectional view showing full contraction of a small-size individual nipple.

FIG. 5 is a cross-sectional view on the line 5—5, looking to the left on FIG. 3.

FIG. 6 is a cross-sectional view on the line 6—6, looking to the right on FIG. 3.

FIG. 7 shows a further embodiment of the nipple.

FIG. 8 is a partly diagrammatic view showing an assembly of the nipple, a snout and a water supply pipe in combination.

Now referring to FIG. 1 and FIG. 2 jointly is shown my new article of manufacture being a plumbing fitting comprising an adjustable pipe nipple having a unitary pair of co-operating pipe elements, a first pipe element 6 adapted for telescopic sliding engagement in a second pipe element 7, the first said pipe element 6 having standard pipe threads 2 at its distal end, the second said pipe element 7 having standard pipe threads 3 at its distal end, and a critical interspace (not shown because of relative small space) of 0.002 to 0.004 inch between the walls of the first said pipe element and the second said pipe element when the said pipe elements are axially aligned.

In FIG. 3 is shown my adjustable pipe nipple in which similar numerals refer to similar parts, and in which figure is shown or indicated (as well as possible) the thickness of the wall A of the first said pipe element 6 being in relation to the thickness of the wall B of the second said pipe element 7 as 2:3.

Now further in FIG. 3 is shown a stippled area indicating a fixed union between the first said pipe element 6 and the second said pipe element 7 by means of solder applied by hand and with the aid of heat and at the correct extension of the adjustable pipe nipple. Now further the said walls A and B of the said pipe elements 6 and 7 respectfully, are made of hardened metal; copper, brass or stainless steel having a minimum Brinell hardness of 65.

I am now concerned to set forth a finesse in my invention never before attained in an adjustable pipe nipple to the end that this nipple is free from failure.

Now in the precise machining of my nipple a ¾ inch hole for example, in one pipe element is tested with a "test-plug" which has a "Go-0.7495-No-Go-0.7500." It can be seen therefore that the expression "Snug-fit" or other such expression in regard to the sliding pipe elements as used heretofore are now meaningless in the face of my precision. I am not concerned with a "Snug-fit"; I am concerned with a critical 0.002 to 0.004 inch interspace between the walls of the said pipe elements when the said pipe elements are axially aligned.

Thus I have found that to increase the interspace above 0.004 inch is to invite failure of the nipple. This may be due to the loss of capillary action; or to an uneven flow of solder or to a combination of the two said reasons; or even to several other reasons. Frankly, with all my study on this subject, I am not sure of the reason or reasons for such failure. Likewise, to decrease the interspace below 0.002 inch also invites failure. This may be due to the inner pipe element expanding from the heat of the torch, thereby closing the interspace and preventing the effective run of the solder. Again, I am at a loss to name the reason or reasons for such failure of the nipple. But, what I do wish to set forth is that I do have a combination of factors including critical measurements and material which produce an adjustable pipe nipple that is free from failure and positive in function as will be further shown and described, hereinafter.

Now further in FIG. 3 the thickness of the wall A of the first said pipe element 6 is to the thickness of the wall B of the second said pipe element 7 as the relation 2:3. This relation is one of the factors in my successful combination of factors. It would seem that the thicker of the two pipe elements should be on the inside to sustain the pressure of the water at the areas where the outside pipe does not support the inside pipe. This however is not true for the over-all success of the nipple. Thus upon the impact of the heat from the torch the inside pipe element heats first and must be thin enough to distribute the heat evenly and fast in order to avoid "Burning" of the pipe and the solder; and in order to produce a sound soldered joint that will not fail. I am concerned to set forth that variations in my successful combination of factors, as for example, the respective relation of the pipe thicknesses to 2:2; 3:2 and 3:1.75 and possibly others in such an indicated series invite failure to the nipple and leave much to be desired. Now therefore stating this important factor in reverse and according to my invention: I have found that the ratio of the thickness of the wall of the second said pipe element to the thickness of the wall of the first said pipe element must be at least as 3:2 and as this ratio increases as for example as 3:1.75 the nipple approaches perfection up to that point but not reaching that point where the water pressure bursts the inside pipe in any one specific application. In other words the thinner the inside pipe the more the nipple in this respect approaches perfection in its functioning.

Now further in FIG. 3 is shown as one of the factors in my successful combination of factors the said walls A and B of the said pipe elements 6 and 7 respectively, the said pipes being made of metal and preferably of hardened copper.

The plumbing trade works with pipe generally known as iron pipe; copper tubing; copper pipe; brass pipe; yellow brass and red brass. Now a special pipe not generally known or used by plumbers but nevertheless still commercially available is a pipe made of hardened copper. This latter said pipe is one of the factors of my successful combination of factors in my new adjustable pipe nipple and is the preferred pipe having a hardness on the Brinell scale of at least 65 and wherein the ratio of the thickness of the wall of the second said pipe element to the thickness of the wall of the first said pipe element is as 3:2.

Now I am concerned to say that metal pipe elements including those made of iron, copper, brass or stainless steel; and all having the said critical interspace and all having the said precise relation of wall thickness; and all having a Brinell hardness of at least 65 are satisfactory individual factors in my successful combination of factors.

I have found that my pipe elements made of such said metals will hold their temper when subjected to the heat of a torch; and when "made-up" will not yield improperly to a wrench; but will perform their functions quickly, efficiently and positively.

In FIG. 4 and FIG. 7 are shown, respectively in actual size, the embodiment of two sizes of the unitary adjustable pipe nipple under my invention.

Now further in FIG. 3 is shown a stippled area indicating the position of a sweatjoint made of commercial solder and applied by hand and employing the aid of a torch to produce a fixed union between the said pipe elements at a predetermined extension of the said elements, and wherein the length of the said sweatjoint is at least twice the outside diameter of the inside pipe.

It can be seen that it is also important that both pipe elements may pass neatly through a carefully made hole in a wall or tile facing; thus to this end is shown in FIG. 5 and FIG. 6, respectively, the outside diameter 4 of the distal end of the first said pipe element being equal to the outside diameter 7 of the second said pipe element.

I have found, above all other considerations, that my nipple functions positively. Moreover, my nipple is more inexpensive to make, is much easier to use and is needed.

FIG. 8 is a partly diagrammatic view showing an assembly of the nipple, a snout and a water supply pipe in combination; and in which figure is shown a snout S, the rim R of a bathtub, a water supply pipe E, a wall W and my adjustable pipe nipple intermediary of the said snout and the said water supply pipe; and is shown the inner pipe element 26 having standard pipe threads 22 being received by the threads S' of the said snout S; and is shown the outer pipe element 27 having standard pipe threads 23 being received by threads in the said water supply pipe E. Further is shown my adjustable pipe nipple expanded within the limits of its operational capacity and connecting the said snout and the said water supply pipe through a hole O in the said wall W. Now in this illustration, the distance between the threads of the snout and the threads of the water supply pipe is measured, allowance being made for the take-up threads; the nipple is expanded to the desired length and soldered by hand with the aid of a conventional torch. The nipple is now installed in the usual manner.

Now I am fully aware that prior to my invention adjustable pipe nipples have been known, as for example, the disclosure in the U.S. patent to Burke No. 654,131 in the year 1900 showing "Snug-fit" smooth wall pipes, "hard metal" elements in telescoping arrangement and adapted for solder as the unifying means. I am not concerned with such constructions.

I am concerned with a precision, relation and composition of elements not heretofore known in an adjustable pipe nipple to the end that such a nipple shall be free from failure and positive in function.

I now present the individual factors of the successful combination of factors in my adjustable pipe nipple:

(1) A critical interspace of 0.002–0.004 inch between the walls of the pipe elements when the said pipe elements are axially aligned.

(2) The ratio of the thickness of the wall of the second said pipe element to the thickness of the wall of the first said pipe element being at least as 3:2.

(3) The pipe elements being made of hardened copper, as described and preferred, or made of metal having a Brinell hardness of at least 65.

(4) The said factors 1, 2 and 3 in combination, and adapted for a sweatjoint of solder as the unifying means of the said pipe elements, the said sweatjoint having a length of at least twice the outside diameter of the inside pipe.

I claim:

1. As a new article of manufacture, a plumbing fitting comprising an adjustable pipe nipple adapted to be rigidly joined in adjusted position, said nipple comprising a unitary pair of co-operating pipe elements, a first pipe element adapted for telescoping sliding engagement in a second pipe element, the first said pipe element having standard pipe threads at its distal end, the second said pipe element having standard pipe threads at its distal end, an interspace of a critical 0.002 to 0.004 inch between the outer wall of the inner first said pipe element and the wall of the second said pipe element when the said pipe elements are axially aligned, the ratio of the thickness of the wall of the second said pipe element to the thickness of the wall of the first said pipe element being at least as 3:2, the said pipe elements having a hardness on the Brinell scale of at least 65, and a bonding substance covering the full interface engagement for an axial distance equal to at least twice the outside diameter of the inner pipe.

2. The new article of manufacture according to claim 1 wherein the outside diameter of the distal end of the first said pipe element is equal to the outside diameter of the second said pipe element.

3. The new article of manufacture according to claim 1 wherein the pipe elements are comprised of a material capable of being bonded together by solder.

References Cited by the Examiner

UNITED STATES PATENTS

| | | | |
|---|---|---|---|
| 654,131 | 7/00 | Burke | 285—287 |
| 689,630 | 12/01 | Autenrieth | 285—390 X |
| 1,273,859 | 7/18 | Hochberger | 285—193 |
| 1,824,838 | 9/31 | Root. | |
| 2,359,846 | 10/44 | Hayman | 285—32 |
| 2,444,847 | 7/48 | Poupitch | 285—169 X |
| 2,484,755 | 10/49 | Smith | 285—32 X |
| 3,006,665 | 10/61 | Harris | 285—302 |

FOREIGN PATENTS 340,534  10/59  Switzerland.

CARL W. TOMLIN, *Primary Examiner.*